United States Patent [19]

Baeck et al.

[11] 4,114,750
[45] Sep. 19, 1978

[54] PRINTER SYSTEM HAVING LOCAL CONTROL FOR DYNAMICALLY ALTERABLE PRINTING

[75] Inventors: Henry S. Baeck, Campbell; William C. Bennett, Menlo Park; David C. Condon, Monte Sereno; Harold R. Gillette, Los Altos; Donald G. Herbert, San Ramon, all of Calif.

[73] Assignee: Hydra Corporation, Mountain View, Calif.

[21] Appl. No.: 602,303

[22] Filed: Aug. 6, 1975
(Under 37 CFR 1.47)

[51] Int. Cl.² .................. B41J 5/30; G05B 19/40
[52] U.S. Cl. .................. 400/279; 400/315; 400/323 400/328; 400/64; 400/124; 101/93.15; 178/30; 178/34; 318/685; 340/172.5
[58] Field of Search .................. 197/1 R, 18, 19, 48, 197/49, 55, 53; 178/23, 26, 30, 34; 318/685; 101/93.15, 93.20; 340/172.5

[56] References Cited

U.S. PATENT DOCUMENTS

| 3,232,404 | 2/1966 | Jones | 197/49 |
| 3,554,347 | 1/1971 | Perkins | 197/48 |
| 3,703,949 | 11/1972 | Howard et al. | 197/1 R |
| 3,789,971 | 2/1974 | Deyesso et al. | 197/18 |
| 3,884,339 | 5/1975 | Castoldi et al. | 197/53 |
| 3,891,077 | 6/1975 | Sauerbrunn | 197/1 R |
| 3,938,641 | 2/1976 | Fulton | 197/1 R |
| 3,970,183 | 7/1976 | Robinson et al. | 197/1 R |

Primary Examiner—E. H. Eickholt
Attorney, Agent, or Firm—Schatzel & Hamrick

[57] ABSTRACT

A printer system having local control for dynamically positioning a print head relative to a print medium utilizing positioning and print data signal inputs, including a control unit for receiving and storing data inputs, the control unit including circuit means responsive to the positioning data for arranging and outputting the stored print data to a print head, control circuitry connected to said control unit and head positioning apparatus employing a movable print medium connected to the control circuitry for positioning the head in relationship to the web in response to said control circuitry so that the head is thereby dynamically controlled by the respective data signal inputs.

6 Claims, 14 Drawing Figures

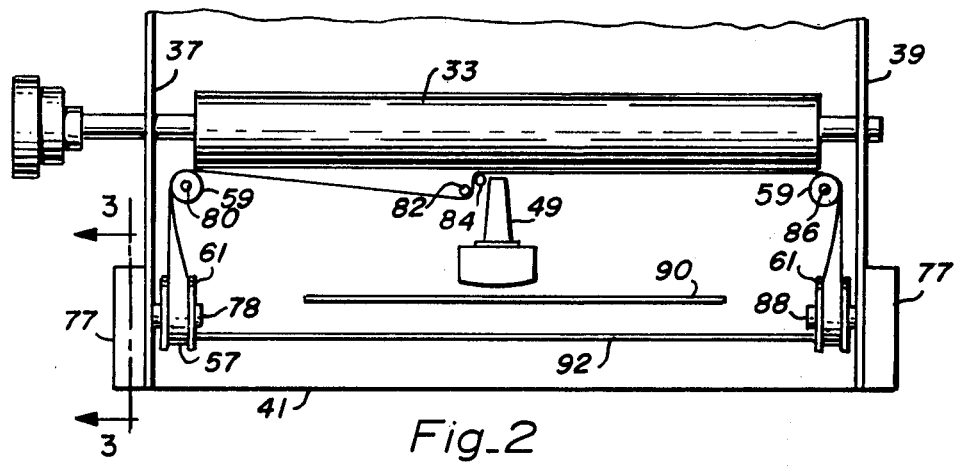
Fig_2
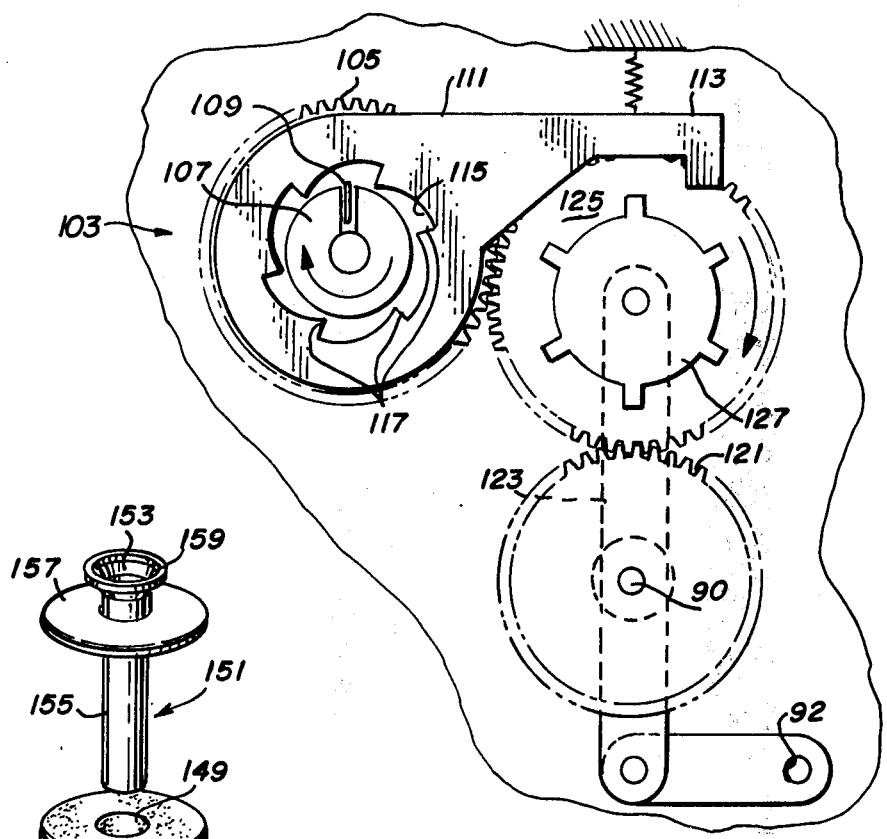
Fig_3
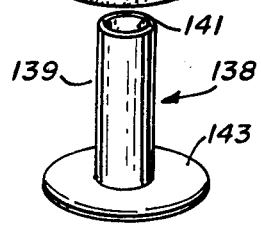
Fig_4

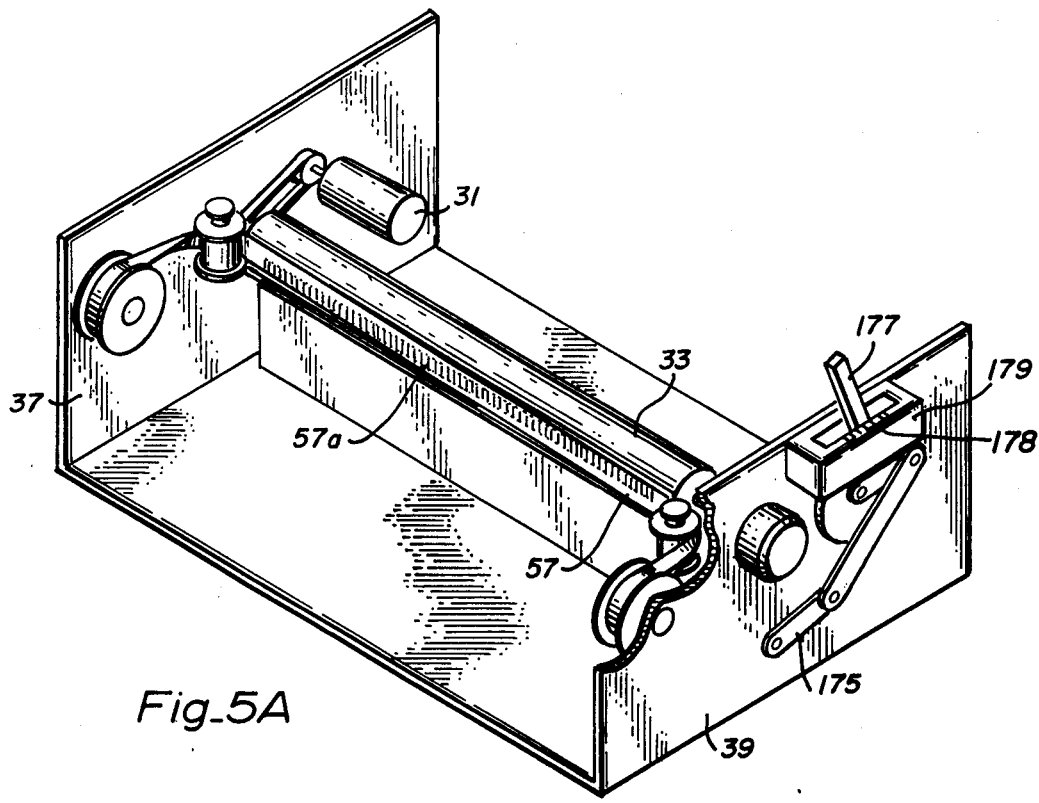
Fig_5A
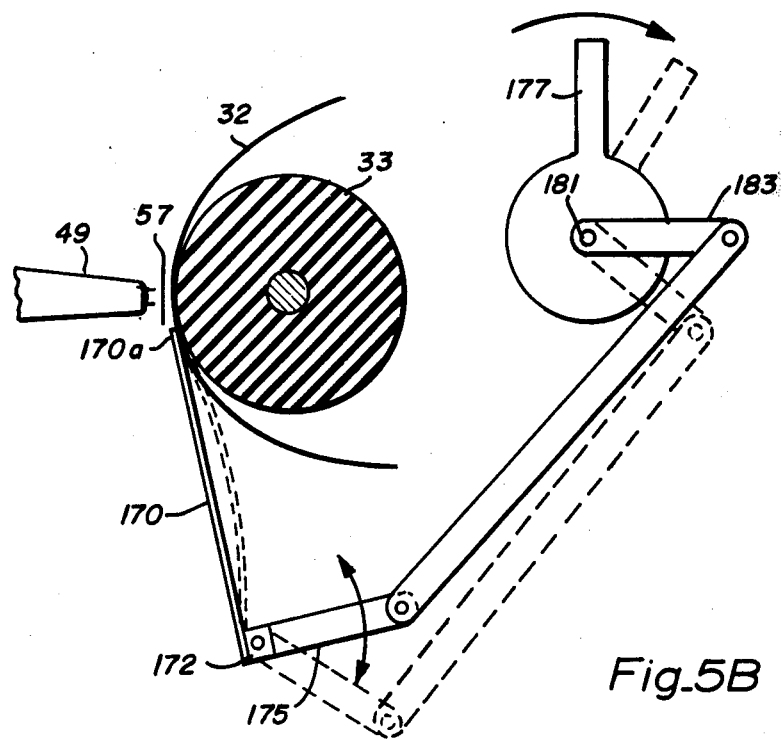
Fig_5B

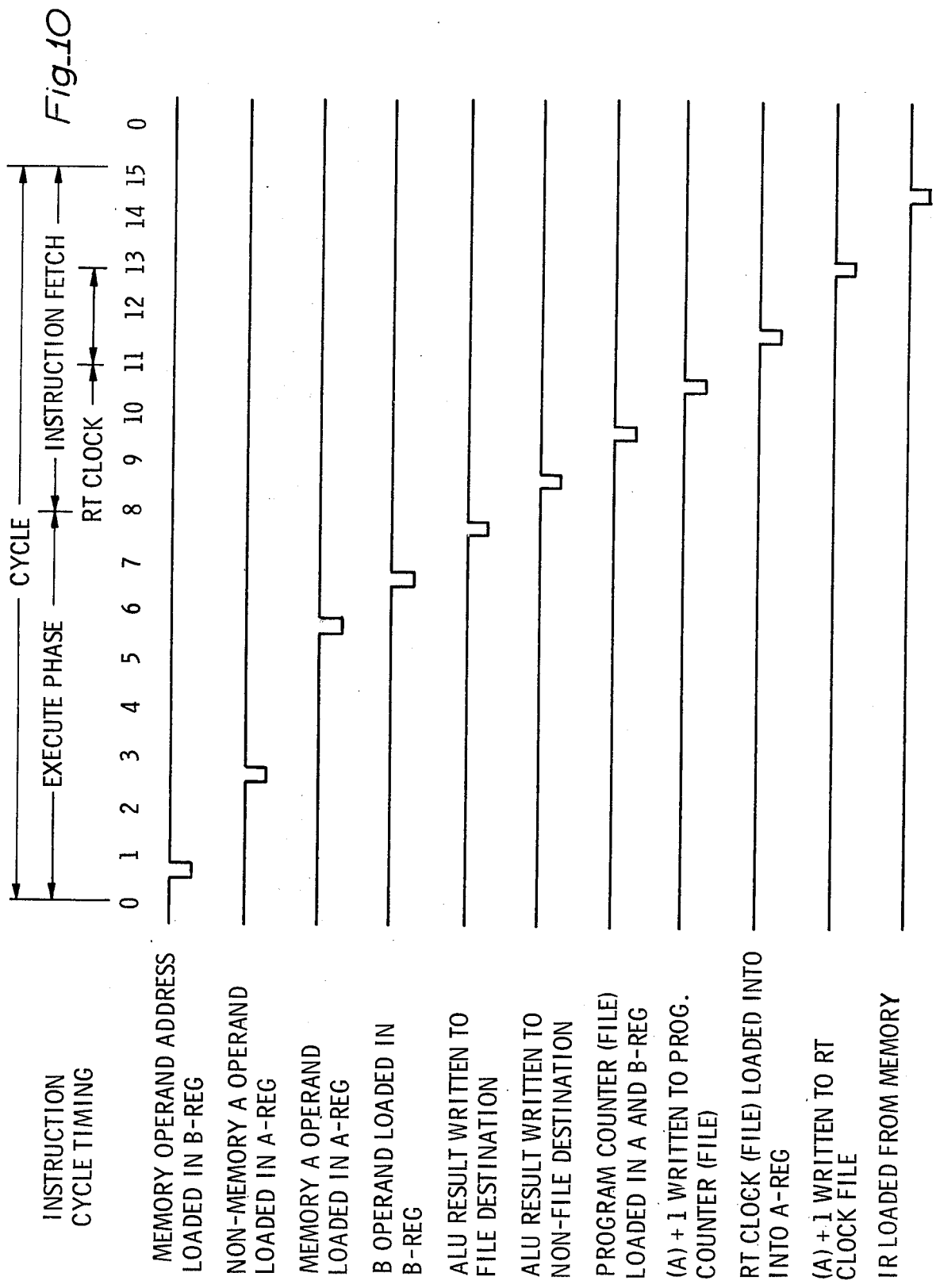

| 15 14 13 12 | 11 10 9 | 8 | 7 6 5 4 | 3 | 2 1 0 | | FORM | | |
|---|---|---|---|---|---|---|---|---|---|
| 0 0 0 0 | | | a | | | | B | a | BRANCH | $a \to F(SC)$. |
| 0 0 0 1 | | | a | | | | BL | a | BRANCH & LINK | $SC+1 \to SC$; $a \to F(SC)$. |
| 0 0 1 0 | d | | | ℓ | | | LF | ℓ,d | LOAD FILE IMM. | $\ell \to F(d)$. |
| 0 0 1 1 | d | | | a | | | LM | a,d | LOAD FILE FROM MEM. | $M(a) \to F(d)$. |
| 0 1 0 0 | d | b | 0 0 | +/− | S | | WF | s,d | WRITE FILE | $SRC(b,s) \to F(d)$. |
| 0 1 0 1 | d | b | 0 1 | +/− | S | | WM | s,d | WRITE MEMORY | $SRC(b,s) \to M(F(d))$. |
| 0 1 1 0 | d | b | 1 1 ds | +/− | S | | WD | s,d | WRITE DEVICE | $SRC(b,s) \to DEV(ds,d)$. |
| 0 1 1 1 | | b | 0 0 0 | +/− | S | t | BF | s,t | BRANCH FALSE | IF (TEST(t) = FALSE) $SRC(b,s) \to F(SC)$ |
| 1 0 0 0 | | b | 0 0 1 | +/− | S | t | BT | s,t | BRANCH TRUE | IF (TEST(t) = TRUE) $SRC(b,s) \to F(SC)$ |
| 1 0 0 1 | | | 0 1 0 | +/− | S | t | RF | t | RETURN FALSE | IF (TEST(t) = FALSE) $SC - 1 \to SC$ |
| 1 0 1 0 | | | 0 1 1 | +/− | S | t | RT | t | RETURN TRUE | IF (TEST(t) = TRUE) $SC - 1 \to SC$ |
| 1 0 1 1 | d | b | 0 0 0 | +/− | S | | A | s,d | ADD | $SRC(b,s) + F(d) \to F(d)$ |
| 1 1 0 0 | d | b | 0 0 1 | +/− | S | | S | s,d | SUBTRACT | $SRC(b,s) - F(d) \to F(d)$ |
| 1 1 0 1 | d | b | 0 1 0 | +/− | S | | AC | s,d | ADD W/CARRY | $SRC(b,s) + F(d) + CARRY \to F(d)$ |
| 1 1 1 0 | d | b | 0 1 1 | +/− | S | | SC | s,d | SUBTRACT W/CARRY | $SRC(b,s) - F(d) - CARRY \to F(d)$ |
| 1 1 1 1 | d | b | 1 0 0 | +/− | S | | X | s,d | EXCL. OR | $SRC(b,s) \oplus F(d) \to F(d)$ |
| 1 1 1 1 | d | b | 1 0 1 | +/− | S | | N | s,d | AND | $SRC(b,s) \cdot F(d) \to F(d)$ |
| 1 1 1 1 | d | b | 1 1 0 | +/− | S | | O | s,d | INCL. OR | $SRC(b,s) \vee F(d) \to F(d)$ |
| 1 1 1 1 | d | b | 1 1 1 | +/− | S | | C | s,d | COMPARE | $SRC(b,s) - F(d)$. ALU STATUS ONLY. |

SRC (0,S) = F(S) IF S≠0, F(SC) IF S=0
SRC (1,S) = M(F(S)) IF S≠0, M(F(SC)) IF S=0
SRC (2,S) = INPUT DEVICE (S)
SRC (3,S) = S(+/− EXTENDED) + F(SC) ON BF & BT
       = S(+/− EXTENDED) OTHERWISE

Fig. 11

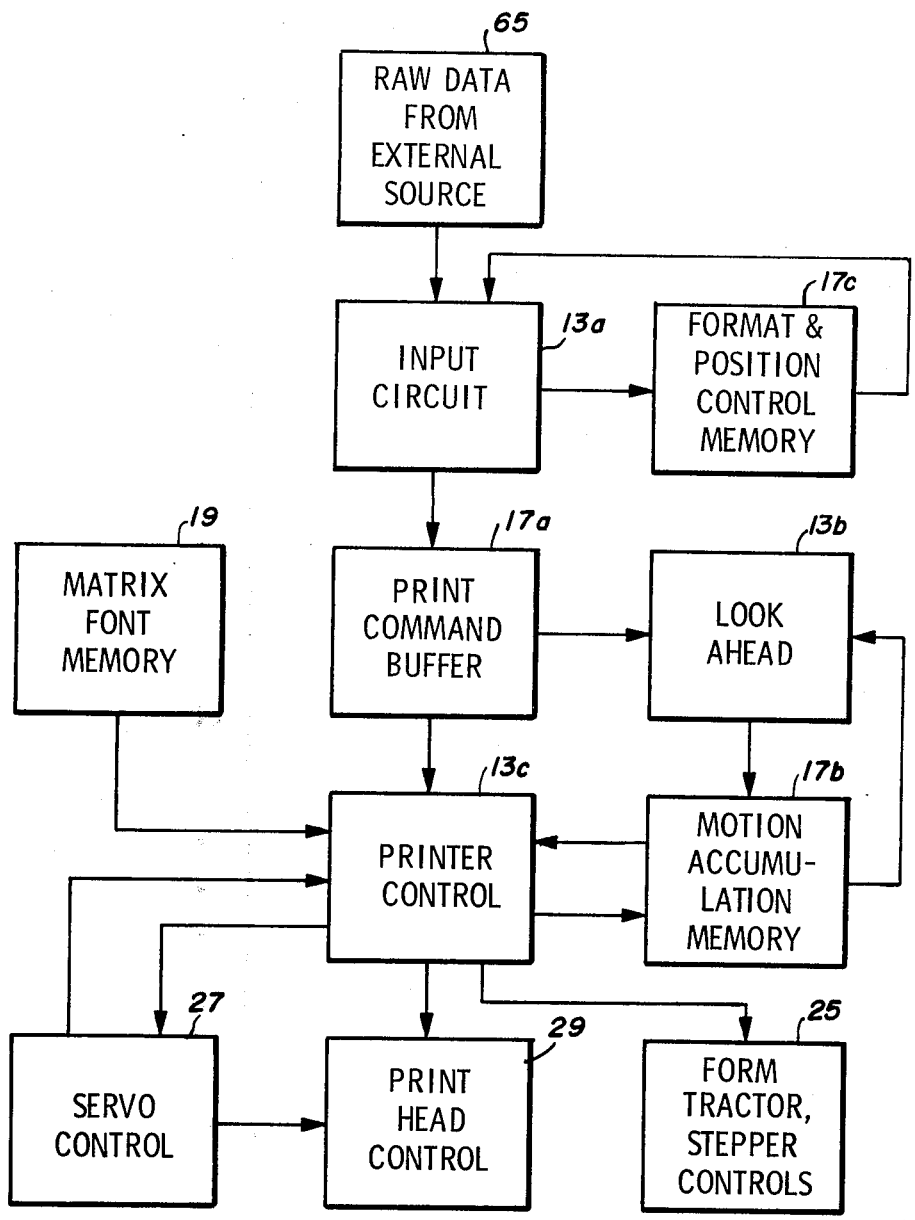
Fig_12

PRINTER SYSTEM HAVING LOCAL CONTROL FOR DYNAMICALLY ALTERABLE PRINTING

CROSS REFERENCE TO RELATED APPLICATION

"Wire Matrix Ballistic Impact Print Head," Ser. No. 507,060, now U.S. Pat. No. 3,929,214 filed Sept. 18, 1974, now U.S. Pat. No. 3,929,214 invented by Donald G. Hebert and assigned to a common assignee.

BACKGROUND OF THE INVENTION

The present invention relates generally to printer apparatus and more particularly to a printer system having a local control unit.

Although print systems utilizing printer apparatus and control circuitry are well known in the art, they require complex apparatus for printing, extensive circuitry for buffering and control, and excessive interfacing circuitry.

Present comparable systems suffer from poor performance, maintainability, inability to operate continuously, lack of reliability, line-to-line spacing variations, poor ribbon life and serviceability. Present systems are deficient in print format control.

Thus, there is clearly a need for a printer system employing reliable, high performance print apparatus and improved control circuitry.

SUMMARY OF THE PRESENT INVENTION

Accordingly, it is an object of the present invention to provide a printer system having improved printing apparatus and control circuitry.

It is a further object of the present invention to provide improved positioning and print control circuitry in a printer system.

It is a further object of the present invention to provide a high performance, fully compatible, print head positioning apparatus.

It is a further object to provide a method for operation of a printer system utilizing local, dynamically alterable format and positioning control.

The foregoing and other objects of the present invention are achieved in a printer system having local control for dynamically positioning a print head relative to a print medium utilizing positioning feedback and print data signal inputs. The printer system includes a control unit for receiving and storing print and positioning data inputs including means, responsive to the positioning data, for arranging and outputting the stored print data to a print head at a rate acceptable to the head. Positioning control circuitry and print control circuitry are provided respectively connected to the control unit. A head-positioning apparatus and a closed loop servo control mechanism is connected to the positioning and print control circuitry, the apparatus positioning the print head in relationship to the print medium in response to the outputs from said circuitry so that the print head is dynamically controlled by the respective data signal inputs. A novel optical transducer system is employed to provide absolute reference position incremental position and servo velocity information.

IN THE DRAWING

FIG. 2 shows the apparatus ribbon transport;

FIG. 3 shows the ribbon drive mechanism;

FIG. 4 shows the re-inking spool;

FIG. 5A shows the print medium tensioner mechanism;

FIG. 5B shows an end view of the tensioner;

FIG. 10 shows the instruction cycle of the control unit and interface of the invention;

FIG. 11 shows the controller instruction set summary; and

FIG. 12 is a block diagram of the information and control flow for the printer system.

DETAILED DESCRIPTION OF THE PREFERRED EMBODIMENT

Figure 1:
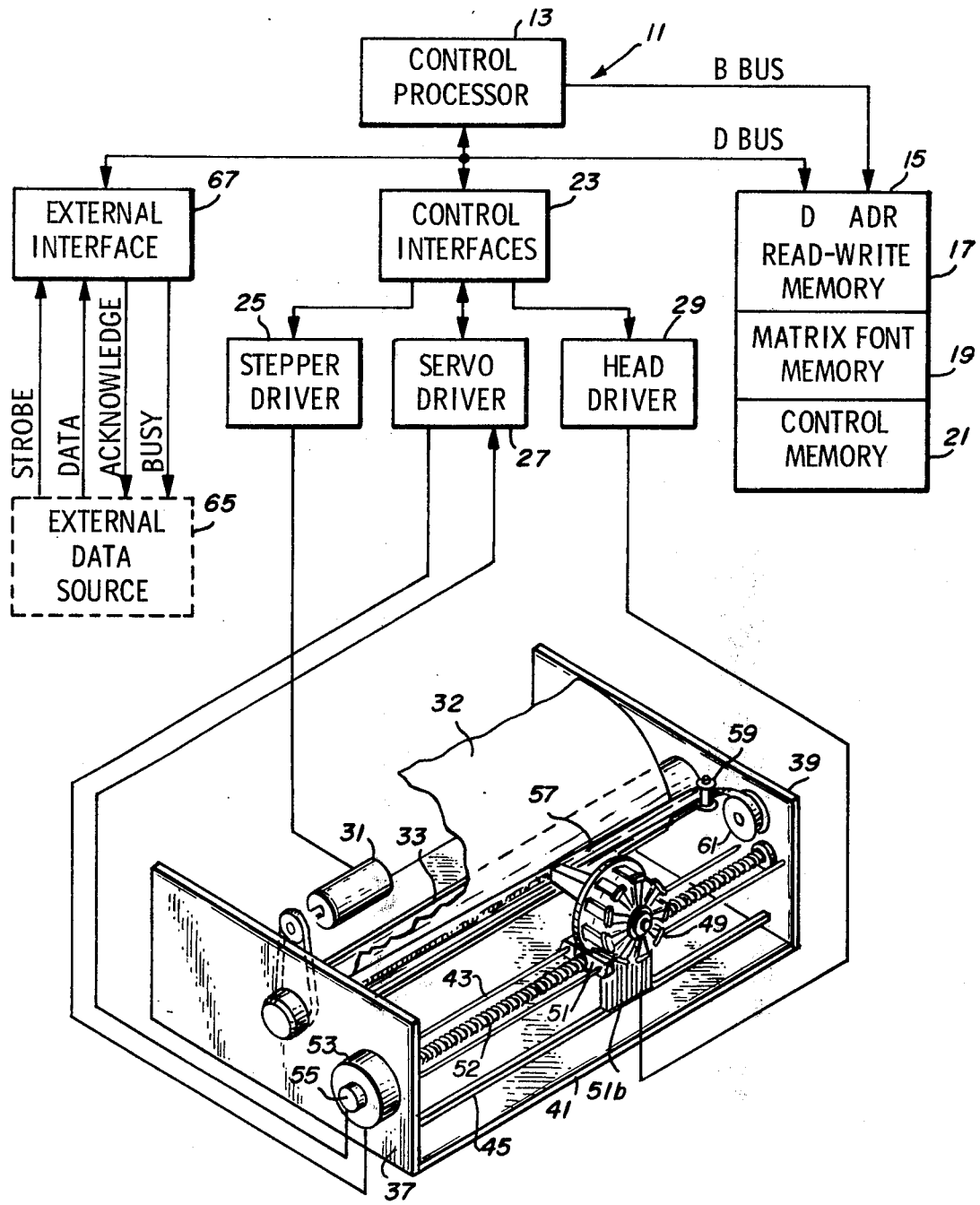
FIG. 1 is a combined block and perspective diagram showing the printer system, including the interconnected electronic system blocks and the print apparatus of the invention.

Referring to FIG. 1, the printer system includes a control unit 11 comprising a control processor 13 connected to the Address (ADR) terminal of a memory 15 via the B BUS. Memory 15 is partitioned into a read-write memory 17, a matrix font memory 19 and a control program memory 21. A bidirectional Data port (D) of memory 15, connects to a D BUS which is also connected to control processor 13. The D BUS and the B BUS provide for bidirectional flow of data as is known in the art. A control interface 23 has bidirectional input-/output terminals connected to the D BUS and has three outputs. The first output is connected to the input of one, or optionally two, stepper drivers 25, the second bidirectional output is connected to a servo driver 27 and the third driver output is connected to a head driver 29. Control interface 23 includes conventional electronic digital circuitry such as TTL integrated circuits connected to receive data from the D BUS and provide logic level output from control interface 23 to drive stepper driver 25. Stepper driver 25 includes conventional electronic circuitry which amplifies the digital output of the control interface 23 connected to receive a four-phase logic level from the data fed to the D BUS by control processor 13. The phases are changed by processor 13 via control interface 23 to driver 25 and thus to drive a stepper motor 31 included within the print apparatus. The print apparatus as will be seen, employs a movable print medium 32 such as a paper web carried over the face of a platen 33, and advanced incrementally by a forms tractor. Stepper motor 31 is connected by suitable gearing to platen 33 and to said forms tractor to cause the tractor to be stepped and thus advance the paper print medium carried thereby in response to four-phase logic levels previously discussed flowing from the control processor 13. The phases may be changed at approximately 4.5 millisecond time intervals to cause approximately 48 steps per linear inch of the media web advance. Each media advance sequence may be concluded by a suitable settling time such as a 22 millisecond period before subsequent operation such as printing on the paper web is initiated.

Platen 33, an elongate roller member, has opposite ends rotatably mounted to left and right side plates 37 and 39, respectively and is used as a rigid surface against which the impact printing occurs. Side plates 37 and 39 are mounted upstanding to and spaced by a base plate 41. Spaced traversal rails 43 and 45 extend between side plates 37 and 39 forward of the platen and adjacent the base plate 41. A print head 49 is spaced forward of the platen 33 and is mounted to a carrier 51. Carrier 51 has downward-protruding members 51a and 51b which respectively engage traverse rails 43 and 45 to thereby accurately position the head 49 surface perpendicular to the platen and traversely between side plates 37 and 39. Carrier 51 is further internally threaded to engage the lead screw 52 which is affixed to servo motor 53. Lead screw 52 is positioned substantially parallel to the platen and is further suitably positioned above base plate 41 so as to locate head 49 immediately forward of the desired line to be printed on the paper web 32.

The servo drive motor 53 is mounted on left plate 37 and has its output shaft directly coupled to lead screw 52. A motion transducer 55 is further mounted to the outboard endplate of motor 53 and as will later be seen, it is directly coupled to the output shaft of motor 53 and lead screw 52. A print ribbon 57 extends traversely between plates 37 and 39 interposed between the head 49 and platen 33.

Print and positioning data is accepted from an external data source 65, such as a computer or modem. Data source 65 is connected to the printer via external interface circuitry 67 which couples the data to the D BUS. Data source 65 has a DATA output connected to an input of external interface 67 and provides a strobe pulse used to latch said DATA in the interface. ACKNOWLEDGE line and BUSY line outputs from external interface 67 are connected to inputs of external data source 65. External data source 65 may provide a conventional data stream output having a character set defined by ANSI X 3.4-1968 (USASCII), wherein code sequences, as will later be seen, will provide the data to configure the form of the printed media, determine a character, a line, a line position, and carriage and media web positioning relative to the form. Of course other codes may be utilized, such as any eight-bit code, to determine comparable functions.

Referring to FIG. 2, the ribbon transport included within the printer system is shown. Left side plate 37 has a first reversible ribbon drive assembly 77 mounted on the outboard side of left plate 37 and having a hub 78 extending through plate 37 for carrying a conventional spool 61. Ribbon 57 wound on spool 61, is deployed toward the platen 33 leaving spool 61 at right angles to plate 37 and being translated in its rearward path along plate 37 to assume a plane parallel to the plate 37 at the point at which the ribbon 57 contacts roller 59. Roller 59 is pivotally mounted on a post 80 holding roller 59 in an upright position relative to the base 41 and the side plates 37 and 39. The ribbon 57 is then transported in a plane generally parallel to the front print surface of platen 33 and passing via posts 82 and 84 toward the right end plate 39. Posts 82 and 84 are carried by head assembly 49, with post 82 being positioned slightly forward as opposed to post 84. The posts establish a predetermined distance between the ribbon 57 and head 49.

At the right traversal of the ribbon 57, the ribbon passes around an additional roller 59 rotatably mounted on a post 86 with the ribbon path being diverted frontward and the plane of the ribbon again being translated for takeup of the ribbon 57 on the right spool 61. The right spool 61 is carried by a hub 88 extending through right end plate 39 and connected to an additional reversible ribbon drive assembly 77 mounted to the outboard side of the plate 39. A drive rod 90 extends between respective end plates 37 and 39 and may be driven from the lead screw 52 by conventional unidirectional clutch and gear reduction means (not shown) located outboard of end plate 39 so as to provide unidirectional rotation of drive rod 90 for driving the reversible ribbon drive assemblies 77. An additional toggle reversing rod 92 extends between end plates 37 and 39 and, as will be seen, is coupled between the respective ribbon drive assemblies 77 so as to permit toggling of the assemblies engaging one spool as a driven spool to deploy ribbon from the opposite spool, and alternately at the end of the ribbon to toggle the respective mechanisms 77 to reverse the spool and ribbon direction of movement.

The ribbon transport may position the ribbon 57 top and bottom edges on a bias relative to the print line for better utilization of the ribbon. The respective rollers 59 are offset to position the right end of the ribbon above the left end. As will be seen in FIG. 5A, the head impact area 57a is at the top of the ribbon at the right and the bottom of the ribbon at the left.

Referring to FIG. 3, the reversible ribbon drive assembly 77 for reversing spool 61 is shown. The assembly 77 comprises a side plate 103 mounted to side plate 37 for carrying the assembly. A driven gear 105 is positioned in a plane parallel to plate 103 and has an inward-extending hub 107 extending through plate 103 and side plate 37 to carry the spool on the inward end of said hub as shown in FIG. 2. The hub 107 has a yieldable, outwardly-urged, sensor member 109, outwardly urged, as by spring means (not shown), to communicate with the overwrap of the ribbon on spool 61. The ribbon 57 wound on spool 61 urges member 109 inwardly toward the hub center against the yieldable outward force by the spring on the sensor member 109. A pawl member 111 having an outwardly-extending arm 113 and having a opening 115, formed in the member 111 is slidably carried on hub 107 on the outward or outboard side of plate 103 and end plate 37. Opening 115 has plural internal teeth 117 capable of being engaged by longitudinally-extending sensor member 109 when said member is free to move outward, no longer restrained by the overwrap of ribbon 57. A drive gear 121 is provided and mounted on the drive shaft 90. A pivot arm 123 is provided free to pivot about the end of drive shaft 90. An idler gear 125 is rotatably mounted at the end of pivot arm 123 and engages drive gear 121. Gears 121 and 125 are mounted in the same engagement plane as gear 105, as will be seen. A ratchet gear 127 is mounted coaxially to idler gear 125 and is positioned in a plane so that the ratchet gear 127 is capable of being engaged by arm 113 of pawl 111. In operation, when the ribbon hub 78 is disengaged as shown, the ribbon 57 may be freely deployed, restrained only by a slight frictional drag of conventional means (not shown). Referring to FIG. 2, ribbon 57 moves from the left spool 61 to right spool 61 driven by right drive means 77. At the end of ribbon on the left spool toggle rod 92 engages left drive assembly 77 and disengages right assembly 77. The left assembly 77 operation, FIG. 3, is such that when sensor 109 moves outward engaging pawl teeth 115 at the end of the ribbon, the pawl 113 rotates to engage ratchet gear 127 restraining the outward ratchet portions of said gear and causing the rotating gear 125 to rotate about pivot 90 to engage gear 105 and 125. Thus engaged, the hub 107 when driven rotates to draw ribbon 57 from the right spool 61. When the right spool 61 is emptied of ribbon, the right drive assembly 77 operates in an identical manner to engage the right spool 61 and via toggle rod 92 to disengage the left drive assembly 77.

Referring to FIG. 4, the reinking roller 59 is shown. Reinking rollers 59 include an elongate bottom section 138 having an outer shoulder 139, and a bore 141 extending through said bottom section. Bottom section 138 has a disk-shaped end plate 143 integrally formed at the bottom end of the bottom section. A resilient elongate roller 145, having a surface 147 for contacting a flat surface of ribbon 57, has an internal bore 149 for mounting the roller 145 on shoulder 139. Roller 145 is formed of a porous material such as compressible sponge-like foam for carrying reinking fluid. The roller 145 is charged with reinking fluid prior to installation and operation of the roller. An elongate top section 151 is provided having a rotation bore 153 for rotatably mounting the reinking roller assembly on posts 80 and 86 as shown in FIG. 2. The posts may have a circular groove formed at the top end of said posts and a circular spring-retainer may be utilized to hold the roller on the respective posts once the roller is installed. The top section has a shoulder 155 mounted within the bore 141 of the bottom section 138. The top section has a disk-shaped end plate 157 integrally formed at the top end of the top section to thereby contain the resilient roller 145. The elongate top section flares outward above disk 157 to form a handle 159 for convenient installation and removal of the roller without the need to touch the inking surface.

Referring to FIGS. 5A and 5B, the paper tensioning means is shown. The tensioner comprises a unitary leaf spring member 170 extending substantially the length of platen 33 between the end plates 37 and 39. The lower end of spring member 170 is connected to a stiffening rod 172 extending the length of the spring member 170 and rotatably mounted at end plates 37 and 39. The stiffening rod 172 is positioned parallel to the platen 33 printing area, that is, the area directly opposite the path of the print head. Spring member 170 is positioned to uniformly contact the print medium or paper 32 positioned on the platen, below and immediately adjacent the line to be printed on the print medium. Lever means 175 is connected to the end of stiffening rod 172 on the outboard side of end plate 39. A handle 177 is provided at the top outboard edge of end plate 39 having an index plate 179. Handle 177 rotates about a pivot 181 and has a lever arm 183 extending outward from pivot 181. A connecting member 185 is provided connecting the outward ends of lever 175 and lever 183 to thereby provide combined lever means for applying force to the stiffening rod 172 by movement of handle 177 to in turn urge a contacting edge 170a of the leaf spring member against the paper or other writing medium 32, for providing uniform pressure to the paper across the platen 33. Platen 33, as previously described, has a stepper or tractor motor 31 applying a force to the back side of the paper or print medium 32. The force provided by the leaf spring 170 immediately below the print area provides a tensioning means for holding the paper or print medium in a predetermined manner at the print area.

The tensioner is provided with a plurality of predetermined indents 178 or other indices on the index plate 179 for referencing predetermined pressures to the paper or print medium for accommodating paper or forms of various thicknesses.

Figure 6A:
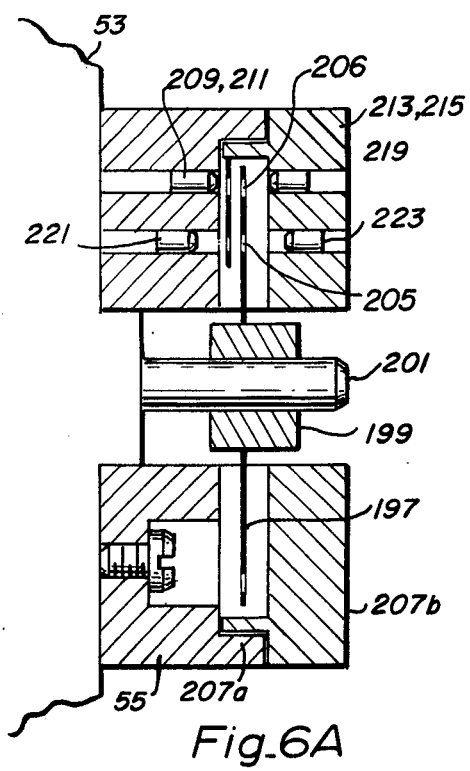
FIG. 6A shows a cross-sectional view of the print apparatus transducer.
Figure 6B:
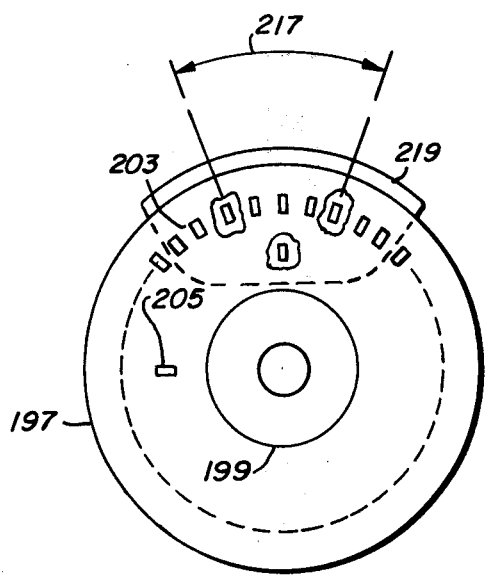
FIG. 6B shows an end view of the transducer.

Referring to FIGS. 6A and 6B, the transducer 55 is shown mounted to the outboard endplate of motor 53.

Transducer 55 includes a rotatable disc member 197 having a hub 199 affixing the disc to the extended shaft 201 of motor 53, and positioning the disc at substantially right angles to shaft 201. Disc 197 has a plurality of slots 203 formed in said disc at a constant radius adjacent the outer rim of said disc. The slots 203 are equidistant from each other and are formed on a first radius from hub 199. An additional slot 205 is formed in said disc and spaced from hub 199 at a second radius. A transducer housing 207 has a first portion 207b engaging portion 207a to enclose disc 197. Housing 207 carries, at the first radius from shaft 201, two angularly displaced photosensors 209 and 211 in housing portion 207a and light sources 213 and 215 carried by housing portion 207b at the first radius, on the opposite side of disc 197. Light source 213, such as a light emitting diode, is in interrupted optical communication with sensor 209 via slots 203 and disc 197. Similarly, light source 215 is in interrupted optical communication with sensor 211. The respective optical communication paths at the first radius are angularly displaced by an angle 217 which is predetermined to provide a 90° offset between the respective interrupted signal paths. A reticle 219 having slots formed therein superimposed over sensors 209 and 211 as well as a reference sensor 221. Recticle 219 is carried at the second radius from hub 199 and is in similar interrupted optical communication with a light source 223 carried by the housing 207b, on the opposite side of disc 197.

In operation, angular displacement of the disc 197 interrupts the respective sources and provides a phase A sinusoidal output signal 225 and a phase B signal 227. Phase B signal 227 is offset 90° from the phase A signal 225, as illustrated diagrammatically in FIG. 7. A further reference pulse signal 229 is provided by sensor 221 and source 223 for each rotation of the disc 197. The rotary motion of the disc 197 provides sinusoidal signals 225 and 227 of relatively fixed amplitude and having a frequency directly proportional to the velocity of disc 197. Signals 225 and 227 may have a frequency of 120 cycles per revolution with the signal 229 providing one pulse per revolution.

Figure 8:
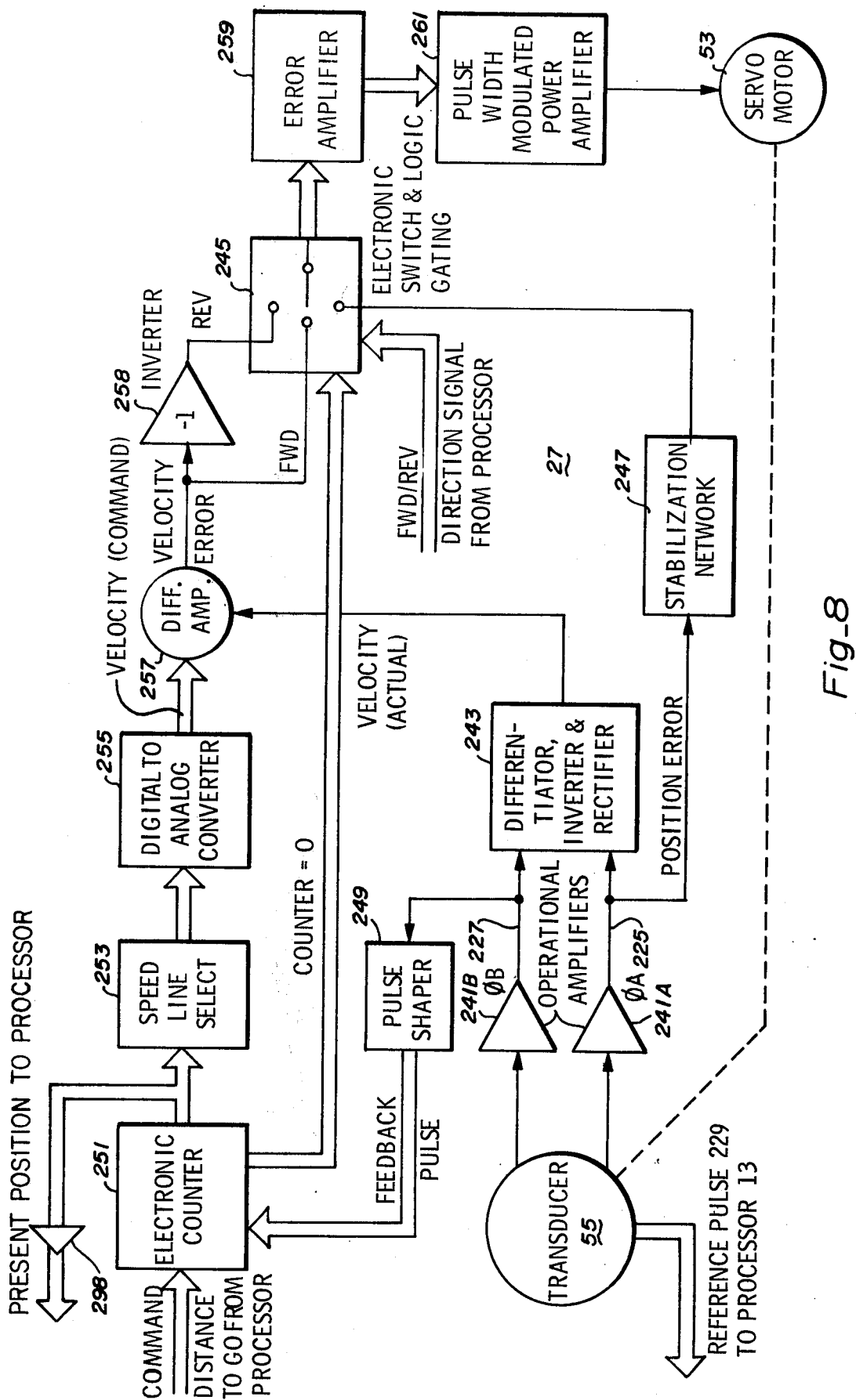
FIG. 8 is a block diagram of the servo driver circuitry.

Referring to FIG. 8, transducer 55 is shown interconnected with motor 53 via servo control 27. Servo control 27 includes two operational amplifiers 241A and 241B having their inputs connected to receive the phase A signal 225 and the phase B signal 227 respective outputs of transducer 55. Operational amplifiers 241A and 241B may be of conventional circuitry having first and second input signal terminals. Operational amplifiers 241A and 241B each have an output connected to the input of a differentiator inverter and rectifier circuit 243. The differentiator inverter and rectifier 243 may comprise first and second resistor-capacitor differentiator networks coupled to the input of conventional amplifiers providing original and inverted output signal phases, thereby providing four-phase signal outputs from the original phase A signal 225 and phase B signal 227 inputs. The rectifier may include diodes in a four-phase detector whereby similarly poled diodes are each connected to one of the four-phase inputs and their opposite poles combined in a single summing point providing a velocity output from the circuit 243.

Circuit 243 is connected to a first input of a differential amplifier 257. A stabilization network 247 is provided having an input connected to the output of amplifier 241A and an output connected to an input terminal of an electronic switch 245. A pulse shaper 249 is provided which generates a logic pulse for each cycle of phase B signal 227 and has an input connected to the output of amplifier 241B and a feedback pulse output connected to a first terminal of a counter 251. An additional input of counter 251 is connected to a control interface 23C and also connected via the D BUS to the command signal output of control processor 13, FIG. 9. The output of counter 251 is connected to the input of a speed line select circuit 253 which may be of conventional circuitry for determining the speed in relation to distance to go and selecting lines on which to print. The output of circuit 253 is connected to the input of a digital-to-analog converter 255. Converter 255 generates an analog voltage corresponding to the required velocity and an output connected to the first input of the differential amplifier 257.

The output of differential amplifier 257 is connected to the input of an inverter 258 and the electronic switch 245 which selects either forward velocity, reverse velocity, or stop motion. The output of switch 245 is connected to the input of an amplifier 259 having an output which is connected to the input of a power amplifier 261. The output of power amplifier 261 is connected to the servo motor 53.

Circuitry 251, 253, 255, 257, 245 and 259 may comprise conventional electronic circuits. Amplifier 261 is preferably of the pulse width modulation type, i.e., an amplifier responsive to an input signal from amplifier 259 to provide output power pulses of varying pulse widths operating in a switched mode to provide proportional power to motor 53. The switched pulse-width modulation circuit is preferred in view of the high efficiency and corresponding low power consumption. Electronic switch 245 has further inputs connected to the output of counter 251 providing a signal when said counter decrements to zero, and forward or reverse signal inputs from the control processor 13 via control interface 23C. A reference pulse signal 229 output is further provided from transducer 55 coupled to processor 13.

In operation, a command set, distance-to-go signal is fed from the processor 13 to the input of counter 251. The carriage move, distance-to-go binary number is converted to an analog voltage via the circuits 253 and 255, so as to actuate the head-positioning mechanism, including motor 53 and lead screw 52, permitting the head to come to a halt at a desired position with minimum overshoot. In operation, each cycle of the transducer 55 output at 120 cycles per revolution provides a feedback pulse reducing the counter 251 count by unitary counts, thus changing the voltage output from the digital-to-analog converter 255. The velocity output signal from circuit 243 is provided at the second input to comparator 257. As the counter 251 count is decremented, the command voltage and thus the speed of motor 53 is correspondingly reduced. When the counter reaches a zero count, the electronic switch 245 is caused to switch from the velocity output of circuit 243 to the position signal output of stabilization network 247, driving motor 53 so that phase A signal input 225 goes to a zero value. Servo motor 53 hunting is prevented by stabilization network 247 which may include a lead-lag network of conventional circuitry which compensates for the system lead or lag including the electronic and mechanical system.

Figure 9:
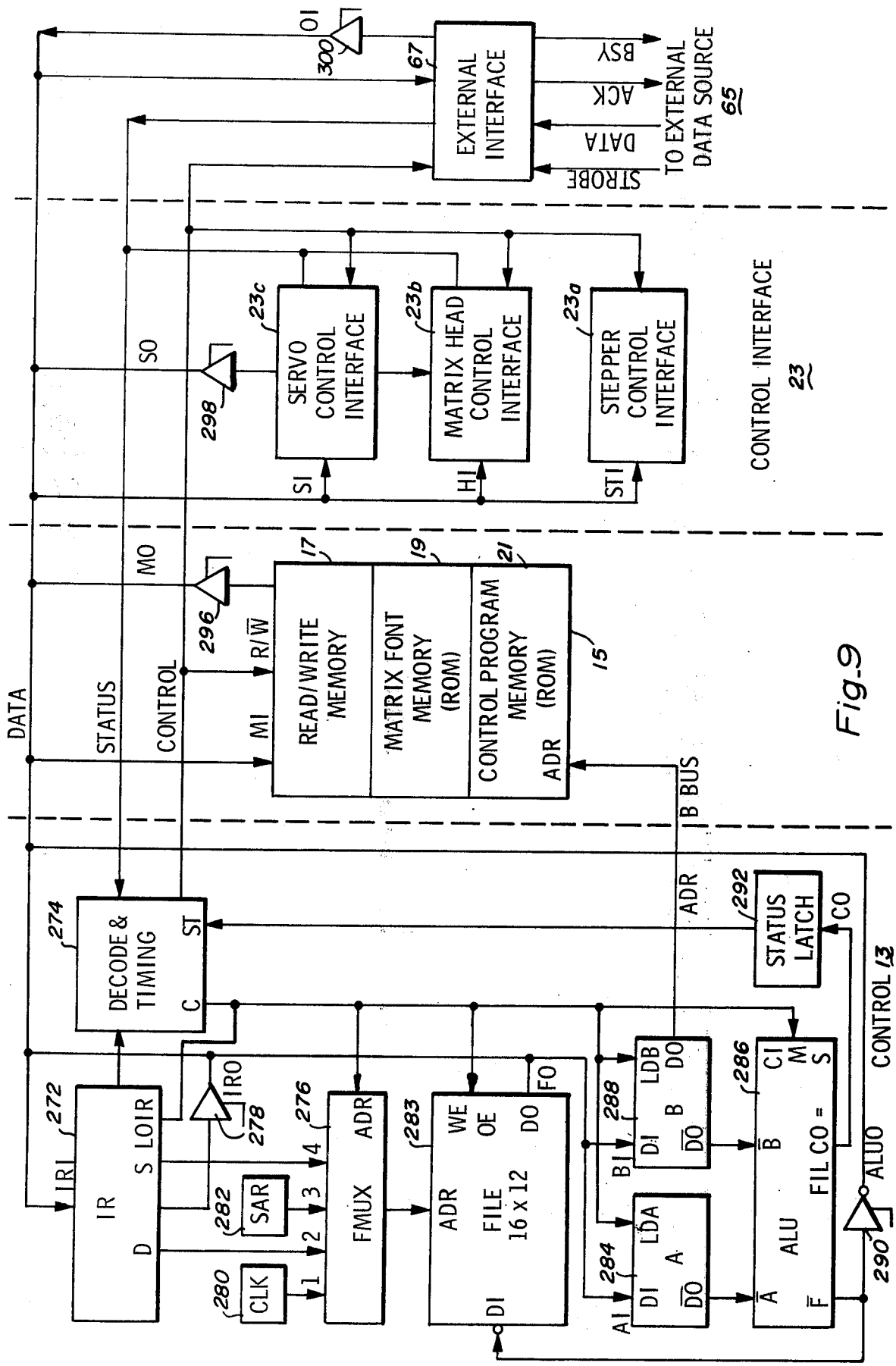
FIG. 9 is a block diagram of the programmable control unit and interface of the invention.

Referring to FIG. 9, the system control unit and interface is shown. Control processor 13 includes an instruction register (IR) 272 having a data input connected to the D BUS. Register 272 has a second LDIR control input connected to the control (C) output of a conventional decode and timing circuit 274. Register 272 has a first D output connected to a second input of an F multiplexer (FMUX) 276. Register 272 has an S output connected to a fourth input of FMUX 276. Register 272 has an additional output connected to the input of a tri-state bus driver 278 which has an output connected to the D BUS. Register 272 has a further output connected to a first input of the decode and timing circuit 274. FMUX 276 has a first input connected to the output of a clock 280 and a third input connected to the output of a stack address register (SAR) 282. FMUX 276 has an input selection address (ADR) connected to the C output of the decode and timing circuit 274. FMUX 276 has an output connected to the address (ADR) input of a register file (FILE) 283. File 283 has a write enable WE and OE output enable input connected to the C output of decode and timing circuit 283. File 283 has a data output (DO) connected to the D BUS. The DO output of file 283 has a tri-state driver 290 connected to the D BUS under control of the OE input.

An A register 284, which may be a 12-bit conventional register such as a TTL integrated circuit, has a load data (LDA) input connected to the C output of decode and timing circuit 274. Register 284 has a $\overline{DO}$ output connected to the A input of an arithmetic logic unit (ALU) 286. Also connected to the D BUS is the DI input of a B register 288. The LDB input of register 288 is connected to the C output of the decode and timing circuit 274. Register 288 may be a 12-bit conventional integrated circuit. Register 288 has a DO output connected to the address (ADR) input of the memory storage 15. The control memory portion 21 of the memory 15 may be a conventional MOS circuit configured as a read-only-memory (ROM). Memory 15 additionally includes conversion and matrix font tables in memory (ROM) 19 and read/write memory 17. Register 288 has a $\overline{DO}$ output connected to the $\overline{B}$ input of the ALU 280. ALU 280 has a combinatorial function $\overline{F}$ output connected to the data input (DI) of file 283 and connected to the input of a tri-state bus driver and inverter device 290. The output of tri-state device 290 is connected to the D BUS. ALU 286 has an M, S and CI input connected to the C output of the decode and timing circuit 274 for determining the function $\overline{F}$ output and a CO output, equal to zero output and sign output connected to the input of a status latch 292. The output of status latch 292 is connected to the C input of decode and timing circuit 274. Decode and timing circuit 274 has inputs connected to the external status bus and provides outputs connected to the external control bus.

Memory storage 15 has a D BUS input connected to the read/write memory portion 17 which may be a conventional 8-bit MOS RAM circuit. A matrix font and conversion memory 19 has an input connected to the data bus via the tri-state driver 296 which has an output connected to the D BUS. Memory 19 may be a conventional 8-bit MOS ROM circuit. Memory portion 17 has an output likewise connected to the input of tri-state line driver 296. A control interface 23 having portions 23a–c having inputs connected to the D BUS provides inputs to the respective stepper, head and servo control interface blocks 23a, 23b and 23c. The matrix head control interface 23b and servo control interface 23c have outputs connected to the status bus. Interface 23c has an output connected to the output of tri-state line drive 298 which has an output connected to the D BUS. Interfaces 23a-c also have inputs connected to the control bus to provide load strobes for accepting data from the D BUS.

Referring to the external interface 67, DATA and data STROBE inputs and acknowledgement (ACK) and busy (BUSY) outputs are connected to external data source 65. External interface 67 is connected to the control bus, the status bus and the data bus. An output from external interface 67 is connected to the input of a tri-state line driver 300 which has an output connected to the D BUS.

Returning now to printer system operation, the system in general receives data from external source 65, stores and buffers both the position and print information in the data and arranges to output stored print and position commands to a print head at a rate acceptable to the print head. The print head may be of the type disclosed in related application WIRE MATRIX BALLISTIC IMPACT PRINT HEAD, Ser. No. 507,060 now U.S. Pat. No. 3,929,214, filed Sept. 18, 1974, invented by Donald G. Herbert and assigned to a common assignee. The printer system dynamically controls the positioning of the print head and effects the print operation under control of the on board local control unit so as to minimize the time required to position the head at a particular coordinate on the print medium and effect the printing of a desired graphic print character at such point, utilizing greatly simplified print apparatus devoid of unnecessary mechanisms such as spacing, feeding, margin tabulation and vertical and horizontal position and format stops and controls. In short, the printer operation is dynamically formatted and printed under continuous control and supervision at the local control unit.

Although control sequences and graphic codes within the incoming data stream will be described utilizing the ANSI character set generic names, any 8-bit incoming data code set may be utilized by using the conversion table in the read-only-memory within the control unit, restricted only to a graphic set of 128 characters in the present system. Although the specific data control and control sequences, including extended control sequences, will be subsequently described together with the output response effected at the printer apparatus, the system operation at the control unit level remains identical for the character-by-character input data and will be first described.

Turning to FIG. 9, the data stream input from source 65 may be either parallel or serial in nature and from either a computer, keyboard or modem, the latter utilizing a conventional conversion in a Universal Asynchronous Receiver Transmitter (UART) logic device which may then be directly interfaced with the control unit D BUS via a tri-state driver. Of course, suitable parallel data may also be accessed to the system D BUS via a tri-state driver. Parallel data is provided to the printer on the data lines along with the strobe signal indicating that data may be accepted. Data is latched in the external interface (serial or parallel) by suitable logic circuit on a character-by-character basis. The control processor 13 periodically senses the status of the external interface 67 and when data is available transfers the data therein via the D BUS to the read/write memory 17 for storage and usage. Then an acknowledge (ACK) control pulse is transmitted to data source 65 to inform the source that external interface 67 may again accept additional data. If the read/write buffer memory 17 becomes full, a busy signal is transmitted to the data source 65 in lieu of an ACK so that further data is not expected until storage is available. Data from source 65 may be accepted at a rate in excess of the mechanical speed capability of the printer limited only by the buffer read/write memory 17. Each character is internally converted by the control unit into a command which defines either a printable graphic, a printer position control function or a format modification function. Printable graphic command and motion control commands are stored in print command buffer 17 for dynamic control of the print mechanism. Format control information is also stored in control tables within memory storage 17.

The control processor 13 processes the graphic commands and motion control commands for the print control buffer 15. A signal to the stepper control interface 23a may be initiated by the processor between line units; servo control signals to servo control interface 23c occur between lines to provide the signals to position the head at the beginning or end of the next line, whichever is closest to the current head position, and to induce the motion across the printed line. Signals to the head control interface 23b are commanded frame-by-frame as the head moves incrementally left to right or right to left in relationship to the print media.

Instructions for the control processor 13 are stored in the control program memory 21. The processor 13 determined instruction cycle includes three periods, instruction fetch, real time clock update and instruction execution. At RESET the IR, 272 is cleared to all zeros (functionally, an unconditional branch to control program memory location zero); the stack address register (SAR) is also cleared to zero by RESET so that initially FILE (zero) contains the next instruction memory location which will be set to zero by execution on the IR 272 contents following a reset.

Referring to FIG. 10, the Instruction Fetch phase is invariant and consists of the following sequence:
1. SAR is selected to address the FILE.
2. The addressed FILE location is transferred to register A as an operand to the ALU and simultaneously transferred to register B to provide a memory address.
3. The function (A) +1 (content of A plus 1) is selected for the ALU.
4. The ALU function output is stored in the addressed FILE location.
5. The information stored at the addressed memory location 15 is then transferred and stored in the IR.

The Real Time Clock update phase is also invariant and includes the following sequence:
1. CLK is selected to address the FILE.
2. The addressed FILE location is transferred from the FILE and stored in register A as an operand to the ALU.
3. A function (A) +1 selected for the ALU output.
4. Unless there is a carry-out (CO) from the ALU, the ALU function output is stored in the addressed FILE location.
5. CLK is toggled to select the alternate address from the alternate clock provided and which will be updated during the next instruction cycle.

A clock update occurs at a time interval between instruction fetch address available and memory data available.

Next in the Instruction Execution phase, the signal output from the IR 272 to the decode and timing 274 determines which individual instruction of the instruction set shown in FIG. 11 next occurs. In FIG. 11 the d-field and s-field is shown together with the flow description of each instruction. The decode defines the source operand (transferred and stored in register A) and the destination operand if present (transferred and stored in register B) and the destination address decoded to provide a strobe at the proper time to latch the result in the proper destination, such as the file, read/write memory, servo distance counter, etc.

The Instruction Execution Cycle may be illustrated by describing the instruction which updates the servo control distance counter 251 of FIG. 8. At the time this instruction is executed, the counter may be zero, the servo consequently stopped, or may be non-zero and the servo in active motion as previously discussed in conjunction with FIG. 8. The distance to be added to the servo counter may previously have been computed and stored temporarily in the FILE 283. The instruction to be used may be an ADD with the s-field designating the servo control counter 251 and the d-field designating the address of the FILE 283 which contains the distance to be added. The following sequents of events may occur to accomplish the instruction execution phase:

1. The current content of the servo control counter 251 is enabled onto the D BUS via the tri-state driver 298. The data is transmitted via the D BUS to the AI input of the A register 284 and is latched into this register by the LDA signal output from the Decode and Timing element 274.
2. The tri-state driver 296 is disabled and the FILE 283 output DO is enabled onto the D BUS. The $d$ output of the Instruction Register 272 is transferred through the FMUX 276 to address the FILE 283. The content of the addressed file 283 is enabled by the OE output enable control onto the D BUS as input BI to the B register 288 and content of the addressed file is latched in the B register 288, by the LDB pulse provided by the decode and timing element 274. The inverted outputs $\overline{DO}$ of the A 284 and B 288 registers provide the $\overline{A}$ and $\overline{B}$ inputs to the ALU 286.
3. The ADD function is forced onto the CI, M and S inputs of the ALU 286 from the decode and timing element 274 which results in the sum, $\overline{(A)} + \overline{(B)}$, of the operands being present on the F outputs of the ALU 286. Said ALU output is written into the addressed FILE 283 register via the DI data input and the WE write enable control signal provided by the Decode and Timing element 274.
4. The F output from the ALU 286 is enabled onto the D BUS via the tri-state inverting driver 290 and is transmitted to the servo control SI input 23c and is latched into the servo control distance counter by a control pulse provided by the Decode and Timing element 274.
5. The updated distance may result in an adjustment of the servo velocity to accomplish the desired motion. Transducer feedback pulses are allowed to modify the servo distance counter only during the instruction fetch phase so that processor update may be time sequenced with feedback pulse induced updates.

As is apparent from FIG. 9, the data sources comprise the File 283, Memory 15, external interface 67 including external data source latches and additionally servo control interface 23c. Data sinks in the system include external interface latches for ACK and BSY signal, the servo distance counter and direction counter from control interface 23c, stepper control interface 23a including control latches and head control interface 23b including matrix drive data latches.

The servo control interface 23c, including the servo velocity profile, is both a data source and a data sink for an arithmetic instruction as illustrated in the above example. This dynamic, incremental accumulation of velocity optimizes printer system performance particularly with asynchronous arrival of data in the print control buffer and specifically permits character-by-character as well as line-by-line control.

Returning to operation of the overall print system, data and strobe signals are provided by source 65, FIG. 12. The control unit 13 examines the character and takes appropriate action.

Referring to FIG. 12, the printer system information and control flow is shown. An input circuit 13a accepts raw data from the External Data Source 65 through the External Interface via the D BUS. The input circuit 13a combines the raw data with formatting and input relative positional data contained in memory to obtain the following outputs:

1. Update of input relative positional data;
2. Update of input relative format data; and
3. Print command data.

The first two outputs are used to update the Format and Position Control Memory 17c and the third output is buffered in the Print Command Buffer 17a for subsequent usage by a Lookahead and a Print Control 13c circuit. Positional and Format information are processed relative to the raw input stream independent of the actual printer position. Two examples will illustrate the Input flow:

1. Let the raw data be the printable "A". Further suppose the input relative position is column 10 of a form for which the right margin is at column 136. For the character "A" other format and positional information are not relevant. A "print the character A" command will be buffered and the input relative position updated to column 11. The right margin will not be exceeded so the input process is considered to be complete.
2. Let the raw data be a sequence of 12 characters: "ESC G 020 030 040 NUL". This sequence commands the printer to "clear horizontal tabs and then set tab stops at positions (columns) 20, 30 and 40." The information derived from this sequence is stored in the Format and Position Control Memory 17c. Subsequent input of an HT character will result in use of the input relative position along with tab stop positions to determine the distance the carriage must move and a "move carriage command" would then be buffered in the Print Command Buffer 17a.

The Format and Position Control Memory 17c is used to remember the following input relative information:

1. Carriage position;
2. Left and Right Margin positions;
3. Line positions with respect to both primary and alternate form tractor control;
4. Form lengths with respect to both primary and alternate form tractors;
5. Bottom of Form with respect to both primary and alternate form tractors;
6. Horizontal tab stop positions;

7. Vertical Tab stop positions with respect to both primary and alternate form tractors.
8. Current option mode selects including double/single space, 6 or 8 lines per inch, automatic bottom to top of form skip, automatic line feed insertion, automatic carriage return and line feed insertion. This information is used by the Input Circuit in combination with the raw data input to modify itself and/or to encode print commands in the Print Command Buffer 17a.

The Print Command Buffer 17a is used to contain print commands such as:
1. Move the carriage one character position and print the graphic "A".
2. Move the carriage "N" positions left or right, no printing.
3. Advance the primary, or alternate, form tractor "N" lines. This data is encoded by the Input Circuit 13a for use by the Lookahead 13b and Print Control 13c. The use of a buffer permits the data input rate to exceed, in bursts, the print rate and allows more efficient usage of time by the Print Control 13c. The use of a buffer also permits acceptance of data at a constant rate, such as from a modem, typically without the requirements of pad characters to fill time for line advance, carriage return and other motion activity. The input rate still may not exceed the effective print rate.

The Lookahead 13b scans data in the Print Command Buffer, up to one full line ahead of that currently being printed. This process provides a means for accumulating form tractor motions and head position motions so that the printer may be commanded in the most efficient, time effective manner in performing the actual control task.

The Motion Accumulation Memory 17b provides a means for storing the accumulated motion distances in advance of the actual print process in order to make the most efficient usage of available times to accomplish that process. Information retained includes:
1. Current beginning and End of Line position.
2. Next beginning and end of Line position.
3. Primary and Alternate form tractor line advance accumulation.
4. End of line buffer position.

In order for the Motion Accumulation Memory 17b to perform its described functions, initialization must be performed each time power is applied to the printer system. This takes place as follows: upon application of power, Printer Control 13c commands servo motor 53 to drive screw 52 at a slow speed so as to move carriage 51 into the left-hand side of the printer by loading a small number such as 5 into electronic counter 251 and commanding switch 245 to be switched into the REV position. The output of counter 251 is monitored for change by Printer Control 13c. Each time the content of counter 251 is changed by the feedback pulse, the Printer Control 13c reloads the original small number into the counter 251. When no change is observed in a given interval of time, the head carriage remains at the left-hand side. Printer Control 13c then commands switch 245 to switch into the FWD position and monitors reference pulse 229. When a pulse 229 is detected, Printer Control 13c causes servo motor 53 to stop by commanding a "zero" distance signal to be input to electronic counter 251 and at the same time resets Motion Accumulation Memory 17b to zero which will then be continuously updated from Electronic Counter via tristate driver 290.

The setting in Motion Accummulation Memory 17b should bear an appropriate relationship to reference pulse 229 each time the pulse is sensed as the head carriage is translated. When the count in Motion Accummulation Memory 17b is not correct at the time reference pulse 229 is sensed, Printer Control 13c will set the correct count into Motion Accummulation Memory 17b by commanding the previously described initialization sequence to take place before continuing further printing. This re-establishes the correct position every revolution of the lead screw so that position errors caused by noise pulses may be corrected before the printed text has accumulated significant position errors.
5. Current commanded carriage position.

The Printer Control 13c provides the means for the real time control of the mechanical print mechanism. Its inputs are derived from the Print Command Buffer 17a, the Motion Accumulation Memory 17b and feedback signals provided by the Servo Control 27 circuitry.

When the current end of line position differs from the current commanded position, the difference is accumulated in the Servo Control 27 counter 252, resulting in a modified commanded motion to arrive at the current end of line position. As position feedback indicates that the print head wire control is ready to accept the next pattern frame, the Print Control 13c retrieves the next pattern from the Matrix Font Memory 19 and outputs the pattern to the Print Head Wire Control 29. On completing the output of a character; the Print Control 13c retrieves the next character from the command buffer 17a and initiates the next action, such as printing the next character.

On completing the printing of a line, the Print Control 13c determines the minimum distance to the beginning or end of next line (if desired), commands head positioning to that point along, and timewise overlapped, with commanding form tractor motions to advance the paper. On completing commanded "preprint" motions, the Motion Accumulation Memory 17b is updated appropriately and printing of the "next", however now "current", line is initiated. Depending on the current head position, and on the availability of buffered data, printing may be left to right or right to left. The Print Control 13c monitors all commanded motions with respect to time. In the case of form tractor motion, time is used to determine completion. In the case of head position motion, time is used to determine a completion deadline which if exceeded, as would only occur in conjunction with a malfunction, results in removal of power from all motion controls. In the case of no print command being available for a period of approximately 2 seconds, and if the print head is not currently positioned within 1 inch of the right stop (character position 136) then the Print Control 13c commands print head motion to move the head 1 inch to the right. This feature is coupled with the ribbon path design, as described elsewhere, to provide visibility to an observing human operator. When the head has been moved right for visibility the Motion Accumulation Memory 17b is updated so that when a print command becomes available, the head may then be moved back prior to initiating the print action.

The Matrix Font Memory 19 provides the means for translating a printable command into a sequence of patterns to be output to the Print Head Wire Control 29.

This sequence may be retrieved in forward or reverse direction to enable left to right and right to left printing.

The Servo Control 27 provides the electronic and electromechanical means for positioning the print head horizontally. Motion may be commanded left to right or right to left a distance in multiples of 0.01 inch. Motion commands are outputs from the Printer Control 13c and result in the accumulation of any residual distance with additional distance. The ability to accumulate distance permits incremental (character by character) printing when input rates are slow. The servo control 27 provides a feedback pulse for each increment moved (0.01 inch) from which is derived timing to:

1. Enable firing of the Matrix Head,
2. Enable output of the next Matrix head pattern from the Print Control,
3. Determine when the head carrier is stationary enabling a direction change.

Coincident with right to left carriage motion, the ribbon is advanced by means of mechanical linkage to the servo lead screw.

The Print Head Control 29 provides means for accepting a data pattern from the Print Control 13c and for converting the pattern to fire the appropriate Matrix Head wires to form a printed character. Firing of the wires is synchronized to head position via the feedback signal pulses derived from the servo control.

The Form Tractor Stepper Control 25 provides the means for accepting the four-phase level outputs from the Print Control Means 13c and for converting the outputs to mechanical motion to advance the paper. Phasing is time sequenced by the Print Control 13c to result in incremental advance by one-fortyeighth inch per step. Eight steps per line result in six lines per inch. Six steps per line result in eight lines per inch. The number of lines to be advanced is computed by the Lookahead 13b and is stored in the Motion Accumulation Memory 17b. Each step requires approximately 4.5 milliseconds; following all steps, approximately a 22 millisecond delay is required to settle the electromechanical mechanism before reinitiation of printing.

Although the present printer system may use a variety of print heads, the combination with the cross referenced WIRE MATRIX BALLISTIC IMPACT PRINT HEAD requires head driver circuitry 29 including digital and power drive logic. The wire pattern may be outputted by the control processor 13 into a ranked latch. The first rank may buffer one matrix frame, the second a pattern for the head. If the second rank is loaded when a servo driver feedback pulse occurs, a current pulse of approximately 400 microseconds is applied to the selected matrix coil drive logic. After this pulse, data from the first rank is loaded to the second rank and ready status is provided the control processor enabling a repetition of the process. The first rank of latches may be loaded by the control processor conventionally by the D BUS and control interface 23. For printing left to right each printed character may comprise ten vertical frames with two being blank, the next seven comprising data taken from the memory font 19 and the last frame being blank. The processor 13 may reverse the order of the vertical frames when printing right to left. With seven data frames each graphic code has a corresponding seven sequential words within the control memory 21. In operation the words are transmitted by the processor 13 in sequence to the head driver 29 for proper frame-by-frame printing as the head moves across the print medium or web. Other, more elaborate font styles may likewise be accommodated, restricted only by the 9 wire positions available at a given horizontal and vertical coordinate as disclosed in the above-referenced application.

Thus, it is apparent that there has been provided printer system having improved printing apparatus and a local control utilizing control circuitry. Moreover, an improved positioning and print control circuitry in a printer system utilizing local, dynamically alterable format and positioning control has been provided.

What is claimed is:

1. Printing apparatus for developing a printout of character print data contained within a data stream received from a remote source, comprising:

print medium transport means including tractor means responsive to first signals and operative to move a print medium in a first direction;

print head means responsive to second signals and operative to cause communicative characters to be developed on said print medium;

carriage means responsive to third signals and operative to alternatively move said print head means in second and third opposite directions transverse to said first direction, said carriage means being further operative to develop position feedback signals;

input means responsive to a stream of input data including character print data, character position data and format data and operative to develop command signals;

look ahead scan means for scanning said print command signals and for determining the distances between the last print position to be assumed by said print head means during a current print line and the respective opposite extreme print positions to be assumed by said print head means during the next succeeding print line and for developing a motion signal indicating which of said extreme print positions is closest to said last print position;

control means responsive to said motion signals, said feedback signals and said command signals and operative to develop said first signals, said second signals and said third signals such that said print head means and said print medium are relatively positioned to effect printout of the first line of print characters, and thereafter upon completion of the printing of the last character on the first and each succeeding print line, said print medium is advanced and said carriage means is caused to move said print head means directly from its last print position of each print line to the nearest one of said opposite extreme print positions of the next succeeding print line without first returning to a fixed reference position and is thereafter caused to move toward the other extreme print position as printout of said next succeeding print line is effected.

2. Printing apparatus as recited in claim 1 wherein said print medium transport means includes, an elongated platen for carrying said print medium and motive means coupled thereto for advancing said print medium in response to said first signals, and wherein said carriage means includes a lead screw disposed in spaced apart parallel relationship to said platen, a movable support for said printing head means operatively engaging said lead screw and movable therealong, and a motor for causing said lead screw to rotate about its longitudinal axis in response to the said third signals.

3. Printing apparatus as recited in claim 2 wherein said carriage means further includes photoelectric transducer means coupled to said motor to provide said position feedback signals.

4. Printing apparatus as recited in claim 3 wherein said photoelectric transducer means includes a first optical source and a first optical sensor disposed in spaced apart relationship and separated by a disc coupled to the shaft of said motor, said disc having a first aperture disposed at a first radius thereof so as to allow said first source to optically communicate with said first sensor upon each rotation of said disc.

5. Printing apparatus as recited in claim 4 wherein said transducer means further includes a plurality of second apertures in said disc disposed at a second radius thereof and at equal intervals around said disc, a second optical source and a second sensor respectively disposed on opposite sides of said disc and optically communicating through said second apertures, and a third optical source and a third sensor respectively disposed on opposite sides of said disc and optically communicating through said second apertures, said second source and sensor being radially separated from said third source and sensor so as to cause the output developed by said second sensor to be 90° out of phase with respect to the output developed by said third sensor, the outputs of said second and third sensors being used to electrically indicate the rotational velocity of said motor.

6. Printing apparatus as recited in claim 1 and further comprising:

memory means for receiving and storing formating data and relative positioned data; and wherein said input means is further responsive to said formating data and said relative positional data stored in said memory and is operative to generate updated relative format data and updated relative positional data as well as said print command signals.

* * * * *

UNITED STATES PATENT OFFICE
CERTIFICATE OF CORRECTION

Patent No. 4,114,750          Dated   Sept. 19, 1978

Inventor(s)   Henry S. Baeck, et al

It is certified that error appears in the above-identified patent and that said Letters Patent are hereby corrected as shown below:

In the Drawings

Figure 7:
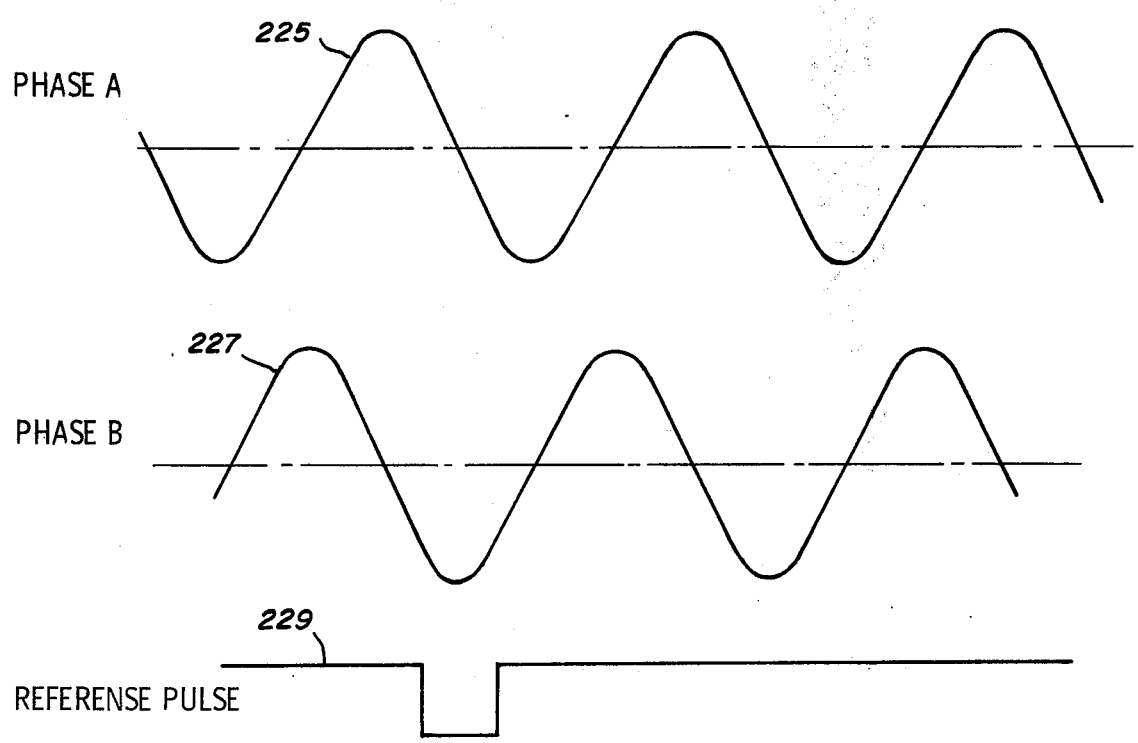
FIG. 7 shows the signal outputs from the transducer.

Fig. 7, delete "REFERENSE" and substitute therefor --REFERENCE--

In the Abstract - line 6, delete "outputing" and substitute therefor --outputting--

Column 1, lines 61 & 62, after "position" insert a comma (,);

Column 2, line 65, delete "elongate" and substitute therefor --elongated--;

Column 6, line 26, delete "Recticle" and substitute therefor --Reticle--;

Column 11, line 3, delete "is" and substitute therefor --are--;

Column 11, line 23, delete "sequents" and substitute therefor --sequence--;

Column 12, line 65, delete "form tractors" and substitute therefor --forms tractor--;

Column 12, line 67, delete "form tractors" and substitute therefor --forms tractors--;

Column 13, line 2, delete "form tractors" and substitute therefor --forms tractor--;

UNITED STATES PATENT OFFICE
CERTIFICATE OF CORRECTION

Patent No. 4,114,750           Dated Sept. 19, 1978

Inventor(s) Henry S. Baeck, et al

It is certified that error appears in the above-identified patent and that said Letters Patent are hereby corrected as shown below:

Continuation:

Column 13, line 17, delete "form tractor" and substitute therefor --forms tractor--;

Column 13, line 32, delete "form tractors" and substitute therefor --forms tractor--;

Column 14, line 47, delete "form tractors" and substitute therefor --forms tractor--;

Column 15, line 28, delete "Form Tractors" and substitute therefor --Forms Tractor--.

Claim 6, line 13, delete "positioned" and substitute therefor --position--

In the named inventors change "Herbert" to --Hebert--

Signed and Sealed this

Second Day of October 1979

[SEAL]

Attest:

RUTH C. MASON
Attesting Officer

LUTRELLE F. PARKER
Acting Commissioner of Patents and Trademarks